(12) United States Patent
Steinman et al.

(10) Patent No.: US 7,171,673 B1
(45) Date of Patent: Jan. 30, 2007

(54) SYSTEM AND METHOD FOR VALIDATING INTERFACES OF DYNAMICALLY LINKABLE COMPONENTS AND REAL-TIME PROCESS CONTROL SYSTEM INCORPORATING THE SAME

(75) Inventors: Jethro F. Steinman, Haverton, PA (US); Brian R. Reynolds, Philadelphia, PA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/369,790

(22) Filed: Aug. 6, 1999

(51) Int. Cl.
*G06F 13/00* (2006.01)
(52) U.S. Cl. ................................................ 719/331
(58) Field of Classification Search ................ 709/331; 719/331
See application file for complete search history.

(56) References Cited

U.S. PATENT DOCUMENTS

| | | | | |
|---|---|---|---|---|
| 5,175,828 A | * | 12/1992 | Hall et al. | 719/331 |
| 5,561,800 A | * | 10/1996 | Sabatella | 719/331 |
| 5,579,518 A | * | 11/1996 | Yasumatsu | 717/131 |
| 5,615,400 A | * | 3/1997 | Cowsar et al. | 709/332 |
| 5,748,963 A | * | 5/1998 | Orr | 717/131 |
| 6,212,660 B1 | * | 4/2001 | Joeressen et al. | 370/469 |
| 6,618,735 B1 | * | 9/2003 | Krishnaswami et al. | 707/203 |
| 6,973,656 B1 | * | 12/2005 | Huynh et al. | 719/315 |

OTHER PUBLICATIONS

K Awaguchi, Character stiring Retrieving Device Equipped With Concatenated Filtering Circuit, 8, 1994, p. 1-2.*
*Sams Teach Yourself CORBA in 14 Days*, Jeremy Rosenberger, Copyright 1998 by Sams Publishing, Relevant Pages: Cover and Copyright Page.
*COM/DCOM Blue Book*, Nathan Wallace, Copyright 1999, The Coriolis Group, Relevant Pages: Cover, Copyright Page, and Section on GUIDs (pp. 64-69).

* cited by examiner

*Primary Examiner*—William Thomson
*Assistant Examiner*—Lechi Truong
(74) *Attorney, Agent, or Firm*—Hitt Gaines, P.C.

(57) ABSTRACT

A system for, and method of, validating an interface of a dynamically linkable component, such that one dynamically linkable component can assess its interface compatibility with another. In one embodiment, the system includes: (1) a check code generator that transforms the interface of the dynamically linkable component into an interface identifier representing the interface and couples the interface identifier to the dynamically linkable component and (2) a interface verifier that employs the interface identifier to determine a compatibility of the dynamically linkable component.

34 Claims, 7 Drawing Sheets

SYSTEM AND METHOD FOR VALIDATING INTERFACES OF DYNAMICALLY LINKABLE COMPONENTS AND REAL-TIME PROCESS CONTROL SYSTEM INCORPORATING THE SAME

TECHNICAL FIELD OF THE INVENTION

The present invention is directed, in general, to real-time process control systems and, more specifically, to a system and method for validating interfaces of dynamically linkable components and real-time process control system incorporating the same.

BACKGROUND OF THE INVENTION

Real-time process control systems were first implemented within a single software program executing on a single computer system. As the need to monitor and control more physical devices increased, the number and the complexity of the software programs required to accomplish this task also increased.

The earliest real-time process control software programs were constructed as a set of separate text constructs called source files. These source files were then transformed into object files and library files using software development tools. Library files contained library routines that were common to several tasks. The use of the library files prevented the programmers from having to redevelop the same routines that had already been developed.

After the software files were written and compiled, the programmers joined them together in an operation called static linking. Static linking caused all of the application programs and the library routines to be joined into a single executable file. This executable file was the program that governed operating of the real-time process control system.

Under static linking, the software development tools informed programmers when an interface incompatibility existed between routines. This allowed the programmers to correct the incompatibility problems when someone changed the interface to one of the library routines. However, static linking required the programmers to re-link all the application programs and library routines whenever a change was made to any application program or library routine.

To correct the problem of having to re-link every time an application program or library routine changed, the software industry developed dynamic linking. Dynamic linking called for the library routines to remain separate from the application programs and stored in what is called Dynamically Linked Libraries ("DLLs"). Once a particular application program actually called a particular library routine during runtime, the operating system (or the infrastructure services for embedded systems) dynamically linked the application program to the library routine. Once the application program and the library routine were dynamically linked, the library routine could perform the desired function.

Under dynamic linking, when a library routine required an update, the programmers were only required to update the DLL and not the application programs that would employ the library routine during runtime. Once the DLL was updated, the application programs could then use the updated DLL without having to perform another static linking. However, dynamic linking has its own problems.

One problem associated with dynamic linking is interface compatibility. Interface compatibility occurs when a calling software routine ("client") communicates to a called routine ("supplier") and the information passed is in the correct order and of the correct type. If the information is disordered or of an incorrect type, then unpredictable results can occur, compromising the integrity and operation of the real-time process control system as a whole.

Interface incompatibility can occur when a routine's interface is changed in a DLL and the application programs that use that particular DLL are not correspondingly changed. This can occur very easily, especially in complex real-time process control systems containing hundreds of application programs. What is needed in the art is a way to ensure that the interfaces of various cooperating application programs, modules or routines are compatible before the interfaces are relied upon.

SUMMARY OF THE INVENTION

To address the above-discussed deficiencies of the prior art, the present invention provides a system for, and method of, validating an interface of a dynamically linkable component, such that one dynamically linkable component can assess its interface compatibility with another. In one embodiment, the system includes: (1) a check code generator that transforms the interface of the dynamically linkable component into an interface identifier it representing the interface and couples the interface identifier to the dynamically linkable component and (2) a interface verifier that employs the interface identifier to determine a compatibility of the dynamically linkable component.

The present invention therefore introduces the broad concept of employing a number (an interface identifier) to allow quick and sure assessment of the interface compatibility of a given dynamically linkable component. The interface of the given component is transformed to generate the interface identifier. The present invention recognizes that, because dynamically linkable components are modular and assumed to be internally consistent, only changes to their interfaces are relevant to their interoperability.

It is important that the right amount of interface information be employed to create the interface identifier. If insufficient interface information is employed in generating the interface identifier, interfaces may appear compatible, when they are not (so-called alpha errors, or false positives). Concomitantly, if information not pertaining to an interface is included, interfaces may appear incompatible, when they are compatible (so-called beta errors, or false negatives). Thus, "transform" is defined for purposes of the present invention as a process in which adequate interface information is employed in creating an interface identifier such that alpha errors are eliminated and beta errors are substantially avoided.

In one embodiment of the present invention, the check code generator transforms the interface of the dynamically linkable component into the interface identifier by transforming a textual representation of at least a portion of the interface. In an embodiment to be illustrated and described, the interface, which can comprise a few thousand characters when represented in textual form, is transformed into a shorter interface identifier. The present invention is not limited to a specific technique for transforming the interface; all suitable conventional and later-discovered techniques (such as hashing) are within the broad scope of the present invention.

In one embodiment of the present invention, the check code generator couples the interface identifier to the dynamically linkable component by placing the interface identifier in a types declaration file. A types declaration file is a file associable with a dynamically linkable component which declares the interface for the dynamically linkable component. The types declaration file also comprises other information. Those skilled in the pertinent art are familiar with the structure and use of types declaration files. Of course, the present invention can couple the interface identifier to the dynamically linkable component in any manner.

In one embodiment of the present invention, the interface identifier varies as a function of a version of the dynamically linkable component's interface. Alternatively, the interface identifier may be version-invariant, under the assumption that changes in a version do not involve changes in relevant interface capability.

In one embodiment of the present invention, the interface verifier employs the interface identifier to determine a compatibility of the dynamically linkable component with a second dynamically linkable component. Thus, peer components can verify their interface compatibility. Of course, the present invention can advantageously allow an operating system to verify the interface compatibility of dynamically linkable components functioning in conjunction therewith, or vice versa.

In one embodiment of the present invention, the interface verifier is a part of a second dynamically linkable component. In this embodiment, each dynamically linkable component may include a interface verifier, allowing each to judge the interface compatibility of the others. Of course, the interface verifier may be placed in any suitable location.

In one embodiment of the present invention, the interface verifier determines a compatibility of the dynamically linkable component by comparing the interface identifier with a history list containing at least one member. Interfaces may be flexible, able to exchange information with more than one particular type of interface. Thus, the interface verifier may be adapted to do multiple comparisons.

In one embodiment of the present invention, the interface identifier is of a type selected from the group consisting of: (1) a check sum and (2) a cyclic redundancy check ("CRC"). In an alternate embodiment of the present invention, the interface identifier can be any number that is computed as a function of the appropriate interface text stream.

In one embodiment of the present invention, the check code generator uses filtering directives to include and exclude portions of the interface from the computation of the interface identifier. In another embodiment of the present invention, the check code generator may use other types of directives to generate an interface identifier.

In one embodiment of the present invention, the system includes: (1) an interface identifier coupled to a dynamically linkable component that represents an interface of the dynamically linkable component and (2) an interface verifier that employs the interface identifier to determine the compatibility of the dynamically linkable component. In another embodiment of the present invention, the interface identifier can be any number or textual information that is computed or manually determined and represents the interface of the dynamically linkable component.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
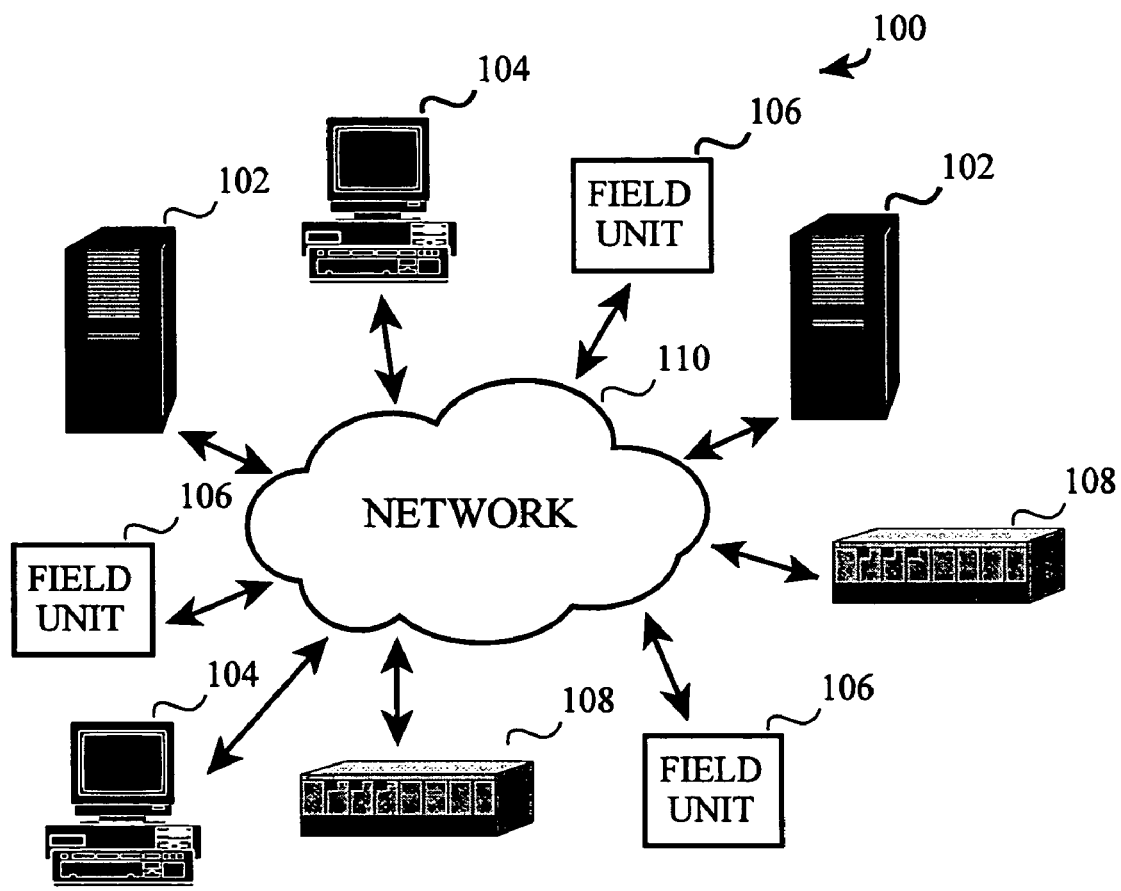
FIG. 1 illustrates a block diagram of a real-time process control system that forms one environment within which the present invention can operate.

Referring initially to FIG. 1, illustrated is a block diagram of a real-time process control system, generally designated 100, that forms one environment within which the present invention can operate. The real-time process control system 100 comprises a network 110 that interconnects a server 102, an operator interface 104, a field unit 106 and a controller 108. In the illustrated embodiment of the present invention, the real-time process control system 100 may comprise any number of servers 102, operator interfaces 104, field units 106 and controllers 108.

The network 110 comprises an industry standard network and industry standard network protocols. The industry standard network protocols, in one embodiment of the present invention, are ETHERNET® and Transmission Control Protocol/Internet Protocol ("TCP/IP"). In an alternate embodiment of the present invention, the network 100 comprises proprietary network and proprietary network protocols. In a third embodiment of the present invention, the network 100 may comprise a combination of industry standard and proprietary networks and network protocols. Wireless communications may also be used for all or part of the network communications.

The server 102 comprises software programs that monitor, process information, and control the physical devices within the real-time process control system 100. The software programs comprise a requesting program "client," and a resource program "supplier" and other miscellaneous programs. The client program sends requests to supplier programs to perform specific functions. The supplier programs receive requests and perform the appropriate functions based upon the type of requests sent. The client programs and supplier programs communicate over the network 110 or internally within the server 102.

The operator interface 104 comprises a computer and a display. The operator interface 104 displays information concerning the current state of the system 100. The operator interface 104 also accepts operator input to perform functions such as controlling a physical device or requesting other information to be displayed on the operator interface's 104 display. The operator interface 104 may comprise both client programs and supplier programs. The operator interface 104 communicates to other programs over the network 110.

The field unit 106 comprises supplier programs that perform tasks related to the physical devices that make up the real-time process control system 100. In one embodiment of the present invention, the field unit's supplier programs collect status information, process data and control the physical devices. In other embodiments, the field unit 106 may perform more or less functions than described above. The field unit 106 responds to client's requests over the network 110. In another embodiment of the present invention, the field unit 106 comprises both supplier programs and client programs.

The controller 108 comprises software programs that perform specific tasks such as collecting status information, processing data and controlling physical devices. The software programs comprise a requesting program "client," and a resource program "supplier" and other miscellaneous programs. In other embodiments of the present invention, the controller 108 may perform additional or fewer functions than described. The controller 108 also responds to requests over the network 110. In another embodiment of the present invention, the controller 108 may comprise functions related to the server 102, the operator interface 104 or the field unit 106.

Figure 2:
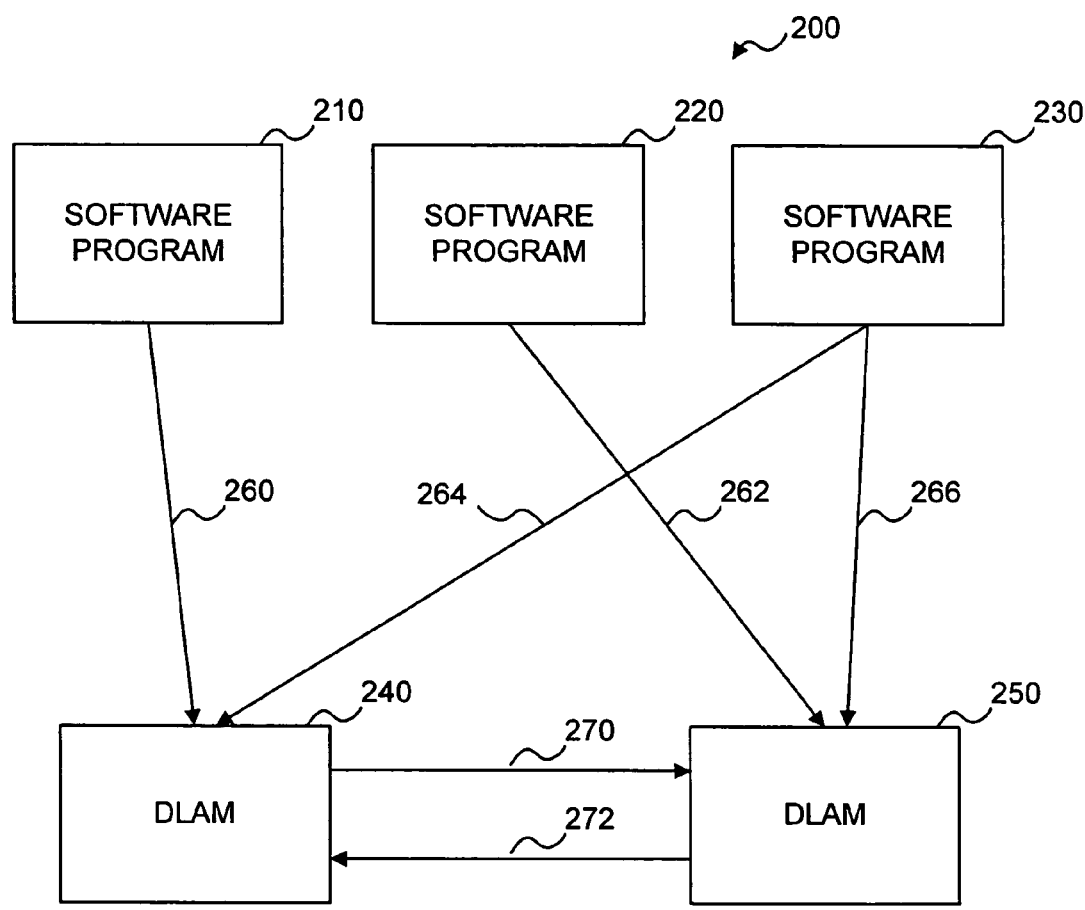
FIG. 2 illustrates a block diagram of a controller's software programs and their associated dynamically linked application modules constructed according to the principles of the present invention.

Referring now to FIG. 2 illustrated is a block diagram of a controller's software programs and their associated dynamically linked application modules constructed according to the principles of the present invention. In the illustrated embodiment of the present invention, each of the controller's software programs 210, 220, 230 perform specific tasks associated with a real-time process control system 100. The common routines used by each of the software programs 210, 220, 230 are in Dynamically Linked Application Modules ("DLAMs") 240, 250.

DLAMs are similar to Dynamically Linked Libraries ("DLLs") or Shared Libraries as used in commercially available operating systems. In concept, the DLAMs can use any linking scheme and any interface calling mechanism appropriate to the particular operating system or infrastructure services employed. DLAMs establish a dynamic link relationship with the calling software program in a method dependent upon the type of operating system used. DLAMs also allow a dynamic link relationship to be established in systems that use embedded operating systems. Those skilled in the pertinent art are familiar with the use of DLLs, Shared Libraries, dynamic linking and embedded operating systems.

The software program 210 establishes a dynamic link relationship 260 with Dynamically Linked Application Module ("DLAM") 240 when the software program 210 gains access to a software routine stored in DLAM 240. In this configuration, the software program 210 is requesting a service and is referred to as a client. The DLAM 240 is performing the service and is referred to as a supplier. In another embodiment of the present invention, the software program 210 and the DLAM 240 are both a client and a supplier to each other.

The software program 220 establishes a dynamic link relationship 262 with DLAM 250. The software program 230 establishes dynamic links relationships 264, 266 with DLAMs 240, 250 respectively. The software programs 220, 230 are clients and DLAMs 240, 250 are suppliers. In another embodiment of the present invention, the software programs 220, 230 and the DLAMs 240, 250 are both clients and suppliers to each other.

Dynamic link relationships can also be established between DLAMs. In the illustrated embodiment of the claimed invention, DLAM 240 establishes a dynamic link relationship 270 with DLAM 250. Also, DLAM 250 establishes a dynamic link relationship 272 with DLAM 240. DLAMs 240, 250 are both clients and suppliers to each other.

Those skilled in the art should note that the present invention is not restricted to use in a controller. In another embodiment of the present invention, the invention may be used in controllers, servers and field units. The present invention is also not limited to the use of only two DLAMs. In other embodiments of the present invention, any number of software programs may establish dynamic links with any number of DLAMs and each DLAM may establish dynamic links with more than one DLAM. Also, other embodiments of the present invention may contain more or fewer functional capabilities then described above.

Figure 3:
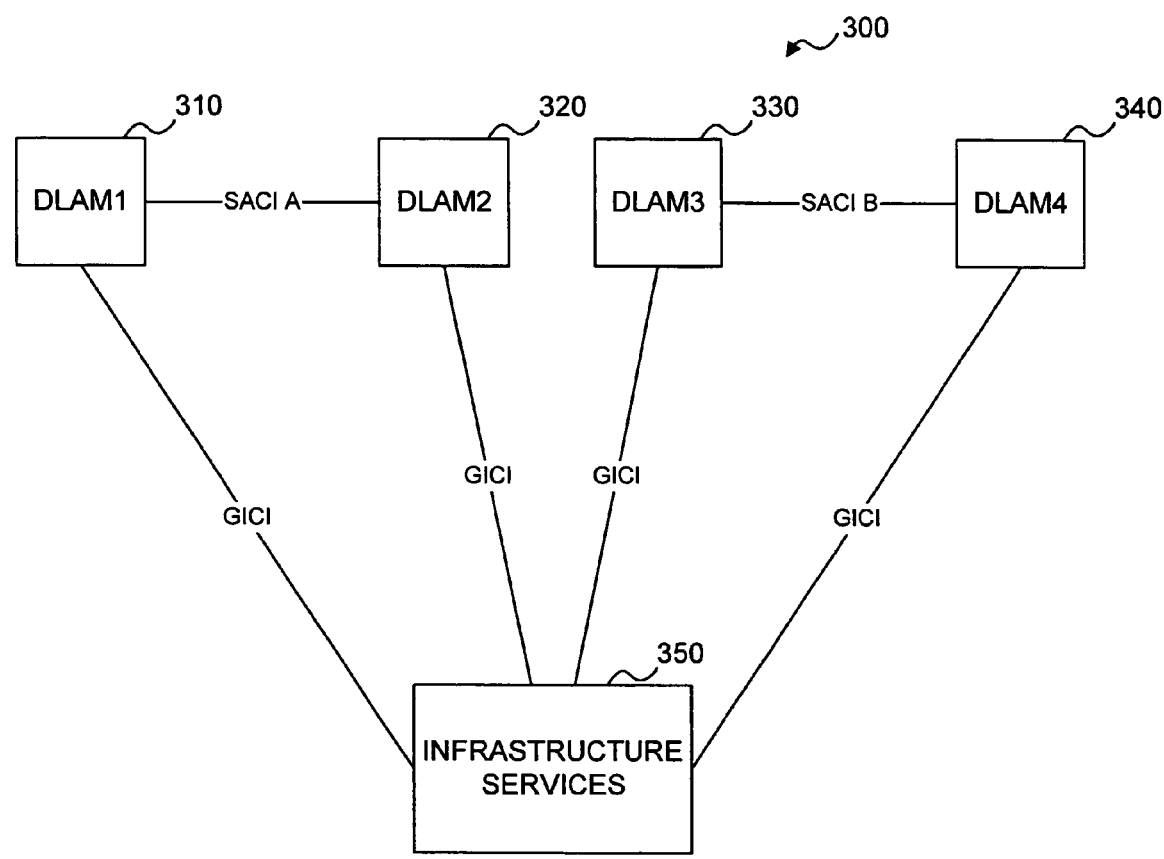
FIG. 3 illustrates a block diagram of generic and specific communication interfaces for dynamically linked application modules constructed according to the principles of the present invention.

Referring now to FIG. 3, illustrated is a block diagram of generic and specific communication interfaces for dynamically linked application modules constructed according to the principles of the present invention. The Infrastructure Services ("IS") 350 is a set of services that provide the environment in which DLAMs may be loaded, linked and executed. In one embodiment of the present invention, the IS 350 is associable with a commercial operating system. In another embodiment of the present invention, the IS 350 is special purpose and is associable with an embedded system.

The dynamic linking between the IS 350 and DLAMs 310, 320, 330, 340 is accomplished by a Generic Infrastructure Communication Interface ("GICI"). A GICI is an interface in which there are a finite and fixed set of functions to be called by the IS 350 upon the DLAMs 310, 320, 330, 340 and by the DLAMs 310, 320, 330, 340 upon the IS 350. The GICI also comprises types declarations associated with the set of functions.

The DLAM1 310 and the DLAM2 320 communicate with each other through a private communications interface called a Specific Application Communication Interface ("SACI"). The DLAM3 330 and the DLAM4 340 communicate with each other through an SACI. Changes to an SACI, or to any of the DLAMs 310, 320, 330, 340 which use the SACI, can be made without modification or release of the IS 350 or of the unrelated DLAMs. For example in FIG. 3, changes to the DLAM1 310, the DLAM2 320 and the SACI A may be made without release of the DLAM3 330, the DLAM4 340 or the IS 350.

Those skilled in the art should note that the present invention is not restricted to use of only four DLAMs. In other embodiments of the present invention, any number of DLAMs may establish dynamic links with the IS 350 and to more than one DLAM. Also, other embodiments of the present invention may contain more or fewer functional capabilities then described above.

Figure 4:
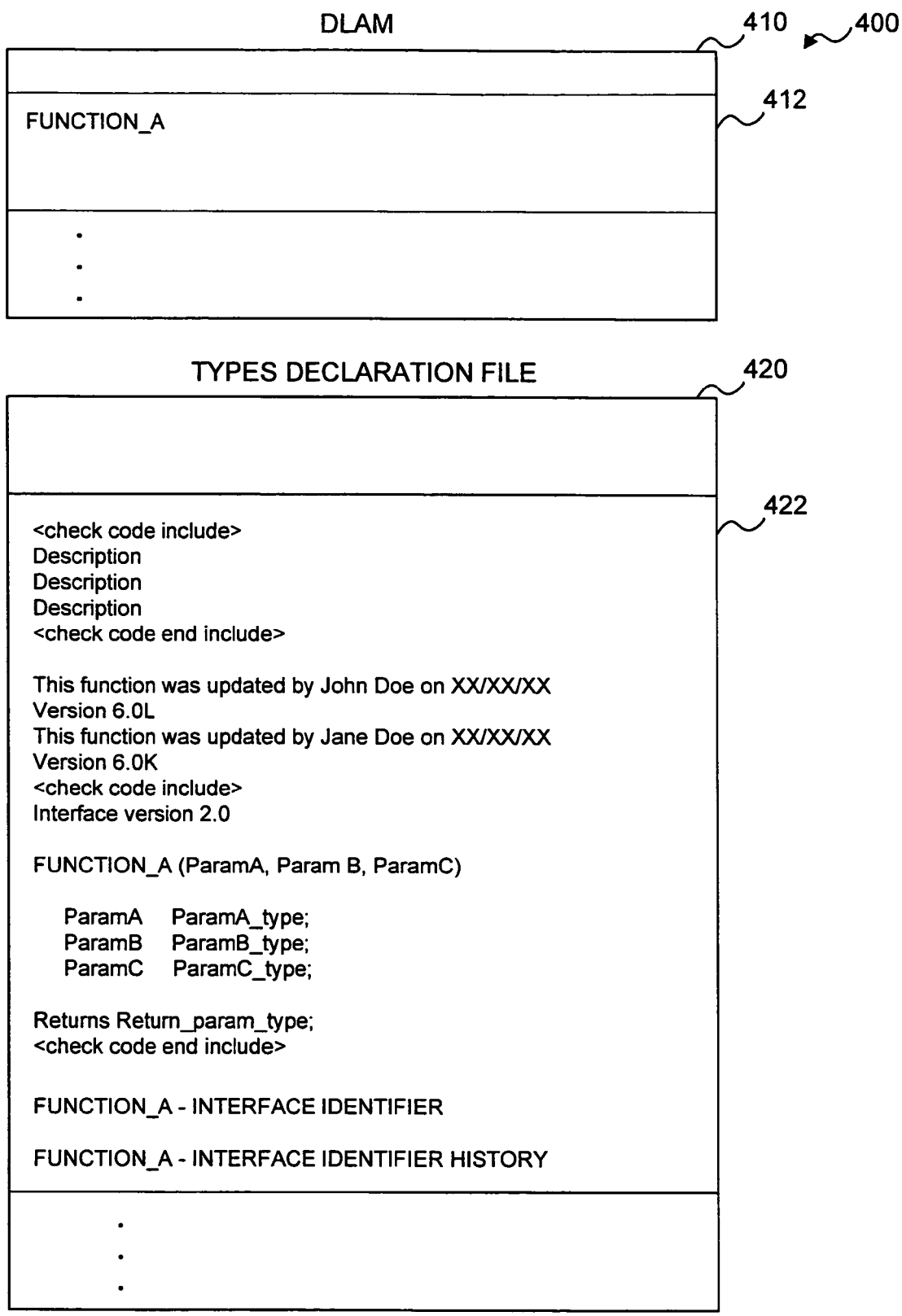
FIG. 4 illustrates a block diagram of a DLAM of FIG. 2 and FIG. 3, and its associated types declaration file constructed according to the principles of the present invention.

Referring now to FIG. 4, illustrated is a block diagram of a DLAM of FIG. 2 and its associated types declaration file constructed according to the principles of the present invention. The DLAM 410 comprises multiple routines used by the controller 108 and other components of the real-time process control system 100. One such routine is FUNCTION_A 412.

The types declaration file 420 is associated with the DLAM 410. The types declaration file 420 contains the interface descriptions for the routines contained within the DLAM 410. FUNCTION_A's interface description 422 shows the interface description associated with the software code for the FUNCTION_A 412. FUNCTION_A's interface description 422 can include the description of the routine, the comments concerning updates, the interface version description, the interface calling parameters, the interface identifier and the interface identifier history.

Also included in FUNCTION_A's interface description are embedded filtering directives. Filtering directives are used by a check code generator to include or exclude specific sections of the interface description in the interface identifier computation. See FIG. 5 for a more detailed description of the check code generator. In another embodiment of the present invention, filtering directives are not used and the interface identifier may be derived from information other that a check code.

The check code generator transforms FUNCTION_A's interface description 422 into an interface identifier that represents the signature of FUNCTION_A's interface. In another embodiment of the present invention, the check code generator transforms multiple interface descriptions and other relative information within the types declaration file 420 into an interface identifier.

The check code generator stores the interface identifier in the types declaration file 420. The check code generator also maintains a history of the interface identifiers associated with each version of the interface. Those skilled in the pertinent art are familiar with the structure and use of types declaration files. In another embodiment of the present invention, the interface identifier may be manually inserted into the types declaration file 420. In other embodiments of the present invention, the present invention can couple the interface identifier to the DLAM in any manner.

Those skilled in the art should note that the present invention is not restricted to a single function or to the function's interface information described above. Other embodiments of the present invention may contain more or less interface information than described.

Table 4-1 shows an example of software code for a routine's interface description.

TABLE 4-1

Interface Description Software Code

```
// begin **********************************************
// contract.h - souce declaration file for SACI ********************
//Filtering_Directive:_IncludeLinesBegin
struct strAccessArgument1 {
    :
    // data declarations appropriate to access argument 1
    :
}
struct strAcessArgument2 {
    :
    // data declarations appropriate to access argument 2
    :
}
struct strContractFPT {
    BOOLEAN (*ValidateInterface) (UINT32);
    UINT32 (*Access) (strAccessArgument1, strAccessArgument2);
}
//Filtering_Directive:_IncludeLinesEnd
// Interface Identifier
```

TABLE 4-1-continued

Interface Description Software Code

```
#define CLIENT_INTERFACE_ID 0x1A6EC029
// Interface Identifier History
#define SUPPLIER_INTERFACE_ID_SET\
{\
3\
0x1A6EC029,\
0xDC035B72,\
0x236AF731\
}
```

Figure 5:
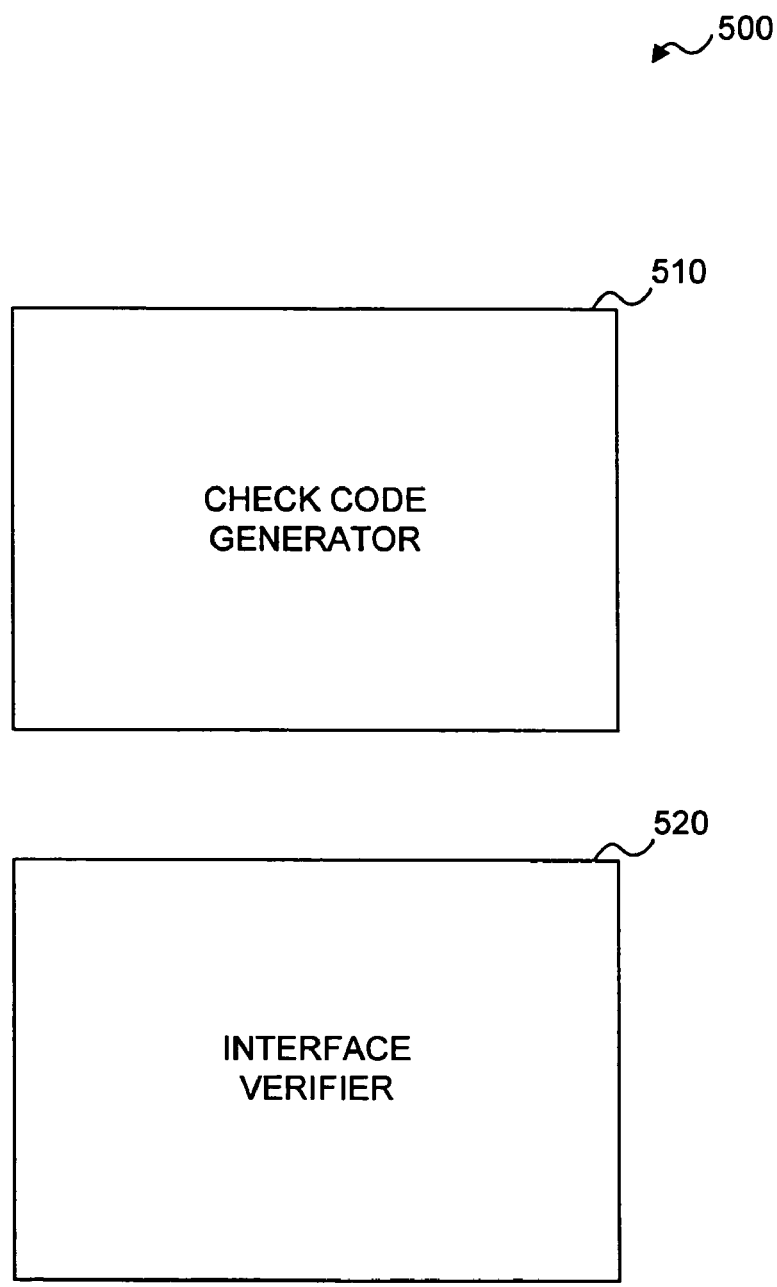
FIG. 5 illustrates a block diagram of a check code generator and a interface verifier.

Referring now to FIG. 5, illustrated is a block diagram of a check code generator and a interface verifier. The check code generator 510 transforms a routine's interface information into an interface identifier to allow the quick and sure assessment of the interface compatibility of a given dynamically linkable routine or component. Because the dynamically linkable routines or components of a DLAM are modular and assumed to be internally consistent, only the changes to the routine's or component's interfaces are relevant to their interoperability.

It is important that the right amount of interface information be employed to create the interface identifier. If insufficient interface information is employed in generating the interface identifier, interfaces may appear compatible, when they are not (so-called alpha errors, or false positives). Concomitantly, if information not pertaining to an interface is included, interfaces may appear incompatible, when they are compatible (so-called beta errors, or false negatives). Thus, the check code generator 510 uses adequate interface information to create an interface identifier such that alpha errors are eliminated and beta errors are substantially avoided.

In one embodiment of the present invention, the check code generator 510 employs filtering directives to allow the check code generator 510 to include and exclude textual interface information in the generation of the interface identifier. In a second embodiment of the present invention, the check code generator 510 also filters out the white space, blank text areas that do not express any semantics of the interface information, from the interface identifier computation.

In one embodiment of the present invention, the check code generator 510 calculates an interface identifier that is a check sum. In an alternate embodiment of the present invention, the check code generator 510 calculates an interface identifier that is cyclic redundancy check ("CRC"). Those skilled in the pertinent are familiar with the generation and use of both the check sum and the CRC. Other methods of generating an interface identifier are within the scope of this invention.

In one embodiment of the present invention, the check code generator 510 maintains an interface identifier history list. The interface identifier history list comprises a list of interface identifiers representing the history of the modifications to the interface. In a second embodiment of the present invention, the check code generator 510 also uses "grandfathering." Under grandfathering, particular function signatures are never changed. If a modification is required to a function, the old function is declared obsolete, but is still supported in the interface. This allows the programs already in the field to maintain compatibility with the updated DLAM.

Associated with the check code generator 510 is the interface verifier 520. The interface verifier 520 employs the interface identifier generated by the check code generator 510 to determine the compatibility of a dynamically linkable routine or component within a DLAM. If the interface identifier stored for a particular dynamically linkable routine or component does not match the calling routine's interface identifier, then the calling routine can safely handle the incompatibility without causing damage to the real-time process control system's physical devices. Without the use of interface identifiers to determine interface compatibility, the calling routines would blindly execute the dynamically linkable routine producing undesirable and unknown results.

In one embodiment of the present invention, the interface verifier 520 is a separate routine apart from the DLAMs. In a second embodiment of the present invention, the interface verifier 520 is part of a DLAM and is used by the DLAM to verify interface compatibility of other DLAM routines or components within the same DLAM or in other DLAMs. In another embodiment of the present invention, the interface verifier 520 uses the interface identifier history list and grandfathering to allow software programs to maintain compatibility with previous versions of DLAMs.

One skilled in the art should know that the present invention is not limited to interface compatibility verification. In another embodiment of the present invention, the check code generator 510 and the interface verifier 520 may be used to verify compatibility of other aspects of the real-time process control system 100. Also, other embodiments of the present invention may have additional or fewer steps or procedures than described above.

Figure 6:
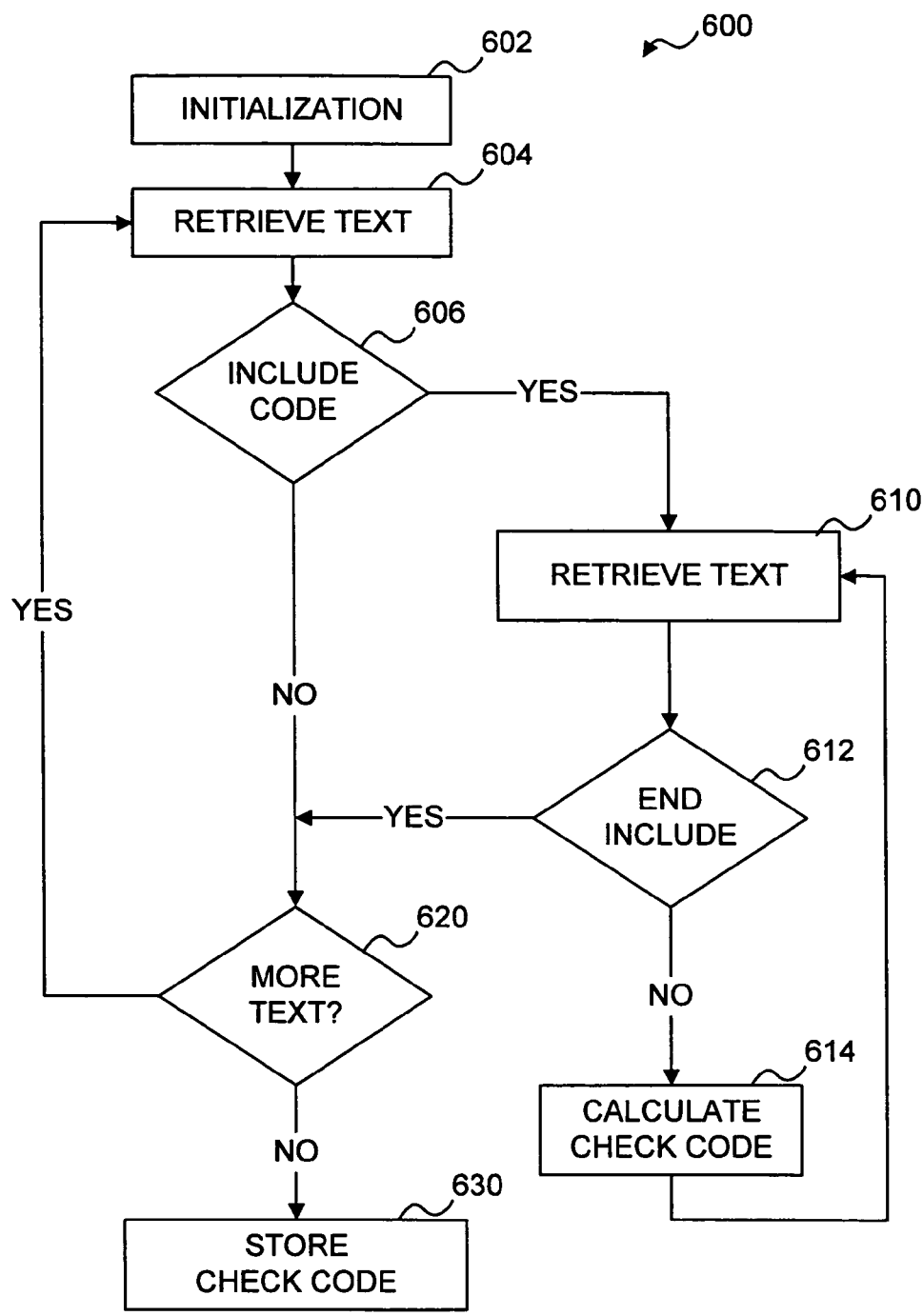
FIG. 6 illustrates a flow diagram of a method of generating an interface identifier from a DLAM routine's interface information of FIG. 4.

Referring now to FIG. 6, illustrated is a flow diagram of a method of generating an interface identifier from a DLAM routine's interface information of FIG. 4. In FIG. 6, the check code generator 510 first performs initialization in a step 602.

After initialization, the check code generator 510 retrieves text from the routine's interface information in a step 604. The check code generator 510 determines if the text retrieved is a filtering directive code to start including text in calculating an interface identifier in a decisional step 606.

If the retrieved text is an include code filtering directive, the check code generator 510 retrieves text to be included in the interface identifier calculation in a step 610. The check code generator 510 then determines if the retrieved text is an end include code filtering directive in a decisional step 612.

The use of filtering directive allows the check code generator 510 to exclude portions of the interface information not pertaining to the interface from the interface identifier calculation. This prevents the so-called beta errors or false negatives. For example in FIG. 4, FUNCTION_A's interface description 422 contains a section that describes who modified the routine and when it was last modified. This section is an example of one type of information that would create a beta error or false negative upon subsequent modifications.

If the retrieved text is not an end include code filtering directive, then the check code generator 510 uses the retrieved text to calculate a check code in a step 614. A check code is a calculated number that is the interface identifier for a DLAM routine's interface. In one embodiment of the present invention, the check code calculation is a check sum. In an alternate embodiment of the present invention, the check code calculation is a CRC. Other methods of generating an interface identifier are within the scope of this invention. The check code generator then retrieves more text to be included in the calculation in the step 610.

If the retrieved text is an end include code filtering directive, the check code generator 510 determines if there is more text in the interface to process in a decisional step 620. If there is more interface text to process, the check code generator 510 returns to retrieve additional text in the step 604.

If there is no additional interface text to process, the check code generator 510 stores the check code as the interface identifier in the associated types declaration file 420. In another embodiment of the present invention, the check code generator 510 couples the interface identifier to the dynamically linkable routine or component in any manner. In a third embodiment of the present invention, the interface identifier may be manually inserted in the types declaration file 420.

One skilled in the art should know that the present invention is not limited to the textual interface information described in FIG. 4 to generate an interface identifier. Nor is the present invention limited to interface identifiers based on a check code. Also, the present invention is not limited to the filtering directives described above. Another embodiment of the present invention may use different filtering directives or no filtering directives. Also, other embodiments of the present invention may have additional or fewer steps than described above.

Figure 7:
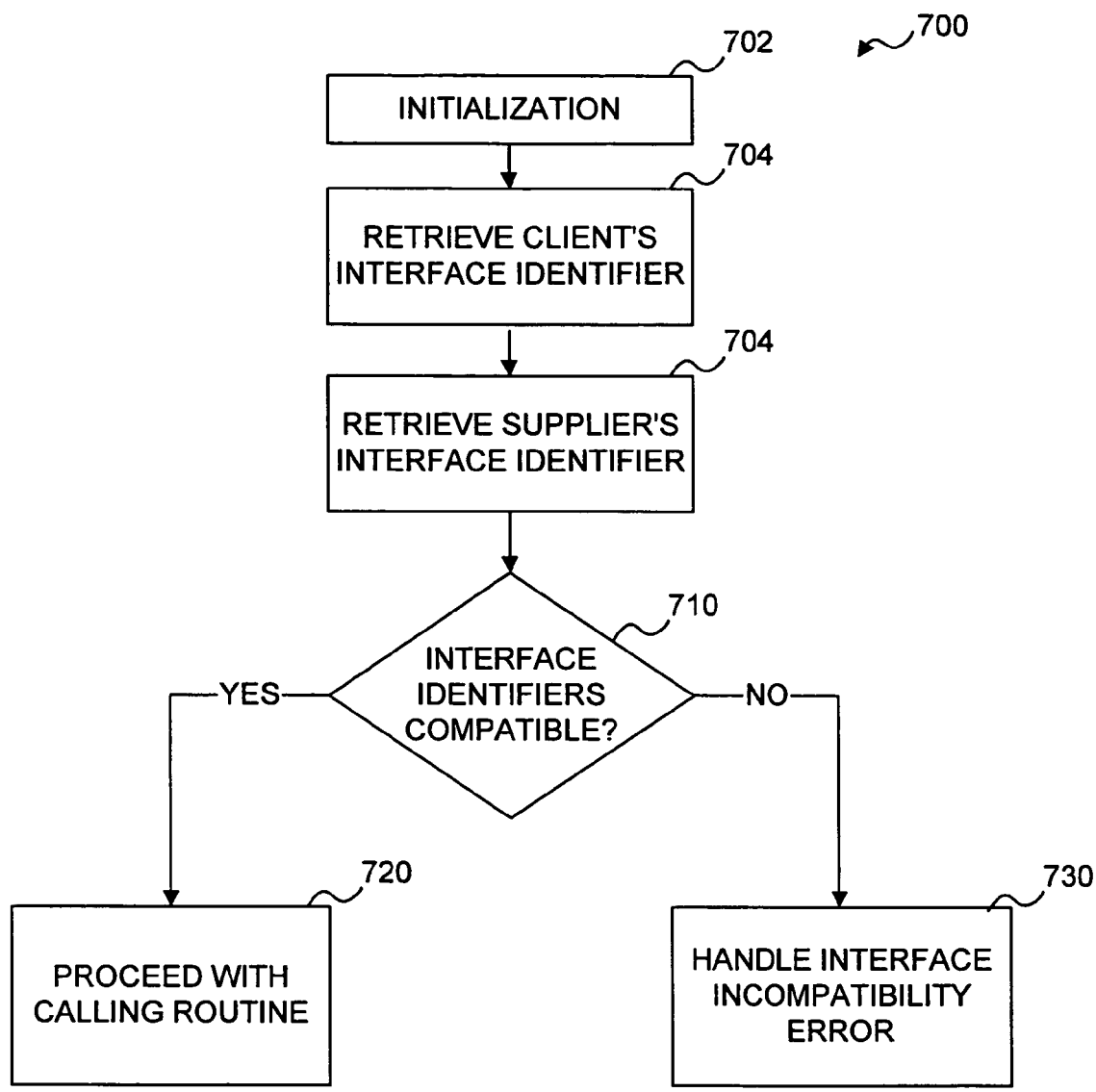
FIG. 7 illustrates a flow diagram of a method of verifying an interface identifier of a DLAM routine's interface information of FIG. 4.

Referring now to FIG. 7, illustrated is a flow diagram of a method of verifying an interface identifier of a DLAM routine's interface information of FIG. 4. In FIG. 7, the interface verifier 520 first performs initialization in a step 702.

After initialization, the interface verifier 520 retrieves the client's interface identifier from the associated types declaration file 420. In another embodiment of the present invention, the interface verifier 520 retrieves the interface identifier from the location in a DLAM where the interface identifier is coupled to the dynamically linkable routine or component.

Next, the interface verifier 520 retrieves the supplier's interface identifier history list. In an alternate embodiment of the present invention, the interface verifier 520 retrieves the supplier's interface identifier from any location associated with the supplier's interface identifier. In a third embodiment of the present invention, the supplier's interface identifier is a single interface identifier.

The interface verifier 520 then determines if the client's interface identifier is compatible with one of the interface identifiers in the supplier's list in a decisional step 710. In another embodiment of the present invention, the interface verifier 520 determines if the client's interface identifier is compatible with a single interface identifier associated with the supplier.

If the interface identifiers are compatible, the interface verifier 520 then proceeds with calling the dynamically linkable routine or component. If the interface identifiers are not compatible, the interface verifier 520 handles the interface incompatibility error and does not call the routine.

One skilled in the art should know that the present invention is not limited to the comparison of a software calling routine and a dynamically linkable routine or component within a DLAM. In another embodiment of the present invention, the interface verifier 520 can verify interface compatibilities of routines within the same DLAM or within other DLAMs. Also, other embodiments of the present invention may have additional or fewer steps than described above.

Although the present invention has been described in detail, those skilled in the art should understand that they can make various changes, substitutions and alterations herein without departing from the spirit and scope of the invention in its broadest form.

What is claimed is:

1. A computer-based system for validating an interface of a dynamically linkable component, comprising:
    a check code generator that employs filtering directives to include or exclude textual interface information to transform said interface of said dynamically linkable component into an interface identifier representing said interface and couples said interface identifier to said dynamically linkable component; and
    an interface verifier that employs said interface identifier to determine a compatibility of said interface of said dynamically linkable component by comparing said interface identifier with an interface identifier history list representing a history of modifications to said interface, said history list containing at least one member,
    wherein said check code generator transforms said interface of said dynamically linkable component into said interface identifier by transforming a textual representation of at least a portion of said interface.

2. The system as recited in claim 1 wherein said check code generator couples said interface identifier to said dynamically linkable component by placing said interface identifier in a types declaration file.

3. The system as recited in claim 1 wherein said interface identifier varies as a function of a version of said dynamically linkable component.

4. The system as recited in claim 1 wherein said interface verifier employs said interface identifier to determine a compatibility of said dynamically linkable component with a second dynamically linkable component.

5. The system as recited in claim 1 wherein said interface verifier is a part of a second dynamically linkable component.

6. The system as recited in claim 1 wherein said history list contains at least two members.

7. The system as recited in claim 1 wherein said interface identifier is a type selected from the group consisting of:
    a check sum, and
    a cyclic redundancy check.

8. The system as recited in claim 1 wherein said filtering directives are configured to substantially avoid alpha and beta errors.

9. A computer-implemented method of validating an interface of a dynamically linkable component, comprising:
    employing filtering directives to include or exclude textual interface information to transform-said interface of said dynamically linkable component into an interface identifier representing said interface;
    coupling said interface identifier to said dynamically linkable component; and
    employing said interface identifier to determine a compatibility of said interface of said dynamically linkable component by comparing said interface identifier with an interface identifier history list representing a history of modifications to said interface, said history list containing at least one member,
    wherein said employing is performed by a check code generator to transform said interface of said dynamically linkable component into said interface identifier by transforming a textual representation of at least a portion of said interface.

10. The method as recited in claim 9 wherein said coupling comprises placing said interface identifier in a types declaration file.

11. The method as recited in claim 9 wherein said interface identifier varies as a function of a version of said dynamically linkable component.

12. The method as recited in claim 9 wherein said employing comprises employing said interface identifier to determine a compatibility of said dynamically linkable component with a second dynamically linkable component.

13. The method as recited in claim 9 wherein said interface verifier is a part of a second dynamically linkable component.

14. The method as recited in claim 9 wherein said history list contains at least two members.

15. The method as recited in claim 9 wherein said interface identifier is a type selected from the group consisting of:
    a check sum, and
    a cyclic redundancy check.

16. The method as recited in claim 9 wherein said employing filtering directives substantially avoids alpha errors.

17. A computer-based system for validating an interface of a dynamically linkable component, comprising:
    an interface identifier, generated by filtering textual information present in said interface and coupled to said dynamically linkable component, that represents said interface of said dynamically linkable component; and
    an interface verifier that employs said interface identifier to determine a compatibility of said interface of said dynamically linkable component by comparing said interface identifier with an interface identifier history list representing a history of modifications to said interface, said history list containing at least one member,
    wherein said generating is performed by a check code generator that transforms said interface of said dynamically linkable component into said interface identifier by transforming a textual representation of at least a portion of said interface.

18. The system as recited in claim 17 wherein said interface identifier is contained within a types declaration file.

19. The system as recited in claim 17 wherein said interface identifier varies as a function of a version of said dynamically linkable component.

20. The system as recited in claim 17 wherein said interface verifier employs said interface identifier to determine a compatibility of said dynamically linkable component with a second dynamically linkable component.

21. The system as recited in claim 17 wherein said interface verifier is a part of a second dynamically linkable component.

22. The system as recited in claim 17 wherein said history list contains at least two members.

23. A computer-implemented method of validating an interface of a dynamically linkable component, comprising:
    generating an interface identifier by employing filtering directives to include or exclude textual information present in said interface;
    coupling said interface identifier to said dynamically linkable component; and
    employing said interface identifier to determine a compatibility of said interface of said dynamically linkable component by comparing said interface identifier with an interface identifier history list representing a history of modifications to said interface, said history list containing at least one member, wherein generating is performed by a check code generator that transforms said interface of said dynamically linkable component into said interface identifier by transforming a textual representation of at least a portion of said interface.

24. The method as recited in claim 23 wherein said coupling comprises placing said interface identifier in a types declaration file.

25. The method as recited in claim 23 wherein said interface identifier varies as a function of a version of said dynamically linkable component.

26. The method as recited in claim 23 wherein said employing comprises employing said interface identifier to determine a compatibility of said dynamically linkable component with a second dynamically linkable component.

27. The method as recited in claim 23 wherein said interface verifier is a part of a second dynamically linkable component.

28. The method as recited in claim 23 wherein said history list contains at least two members.

29. A real-time process control system, comprising:
a plurality of sensors and controllable devices;
a controller, coupled to said plurality of sensors and controllable devices, that executes software having at least first and second dynamically linkable components to coordinate an operation of said plurality of sensors and controllable devices;
an interface identifier, generated by filtering textual information present in said interface and coupled to said first dynamically linkable component, that represents an interface of said first dynamically linkable component; and an interface verifier that employs said interface identifier to determine a compatibility of said interface of said first and second dynamically linkable components by comparing said interface identifier with a history list representing a history of modifications to said interface, said history list associated with said second dynamically linkable component and containing at least one member, wherein said generating is performed by a check code generator that transforms said interface of said dynamically linkable component into said interface identifier by transforming a textual representation of at least a portion of said interface.

30. The real-time process control system as recited in claim 29 wherein said interface identifier is contained within in a types declaration file.

31. The real-time process control system as recited in claim 29 wherein said interface identifier varies as a function of a version of said first dynamically linkable component.

32. The real-time process control system as recited in claim 29 wherein said interface verifier is a part of said second dynamically linkable component.

33. The real-time process control system as recited in claim 29 wherein said history list is associated with said second dynamically linkable component and contains at least two members.

34. The real-time process control system as recited in claim 29 wherein said interface identifier is a type selected from the group consisting of:
a check sum, and
a cyclic redundancy check.

* * * * *